United States Patent
Yankovich et al.

(10) Patent No.: US 9,727,856 B2
(45) Date of Patent: Aug. 8, 2017

(54) GIFT CARD CONVERSION AND DIGITAL WALLET

(71) Applicant: eBay Inc., San Jose, CA (US)

(72) Inventors: Steve Yankovich, San Jose, CA (US); Ryan Melcher, Ben Lomond, CA (US); Robert Dean Veres, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/230,626

(22) Filed: Mar. 31, 2014

(65) Prior Publication Data

US 2014/0214661 A1    Jul. 31, 2014

Related U.S. Application Data (63) Continuation of application No. 13/970,454, filed on Aug. 19, 2013, now Pat. No. 8,701,982, which is a continuation of application No. 13/341,142, filed on Dec. 30, 2011, now Pat. No. 8,511,543, which is a
(Continued)

(51) Int. Cl.
*G06Q 20/32* (2012.01)
*G06Q 20/34* (2012.01)
*G06Q 30/06* (2012.01)
*G06Q 20/36* (2012.01)
(Continued)

(52) U.S. Cl.
CPC .......... *G06Q 20/342* (2013.01); *G06Q 20/28* (2013.01); *G06Q 20/3223* (2013.01); *G06Q 20/3276* (2013.01); *G06Q 20/351* (2013.01); *G06Q 20/36* (2013.01); *G06Q 30/06* (2013.01); *G06Q 40/04* (2013.01)

(58) Field of Classification Search
CPC .......... G06Q 20/3223; G06Q 20/342
USPC .................... 235/380, 375; 705/39
See application file for complete search history.

(56) References Cited

U.S. PATENT DOCUMENTS

| 8,511,543 B2 | 8/2013 | Yankovich |
| 8,523,054 B2 | 9/2013 | Yankovich et al. |
| 2009/0082663 A1 | 3/2009 | Guan et al. |

(Continued)

FOREIGN PATENT DOCUMENTS

| AU | 2008101033 A4 | 11/2008 |
| DE | 102009034436 A1 | 1/2011 |

(Continued)

OTHER PUBLICATIONS

"U.S. Appl. No. 13/050,699, Advisory Action mailed Oct. 24, 2012", 3 pgs.
(Continued)

*Primary Examiner* — Toan Ly
(74) *Attorney, Agent, or Firm* — Schwegman Lundberg & Woessner, P.A.

(57) ABSTRACT

A method and a system convert the value of a gift card for use with a mobile device. The value of the gift card is determined from an issuer of the gift card. The value of the gift card is stored in a digital payment account in a storage device. The digital payment account stores values of gift cards from issuers. A financial transaction corresponding to the issuer of the gift card is performed on the digital payment account. The value of a first gift card from a first issuer of a first digital payment account is exchanged with the value of a second gift card from a second issuer of a second digital payment account.

24 Claims, 10 Drawing Sheets

Related U.S. Application Data continuation of application No. 13/050,699, filed on Mar. 17, 2011, now Pat. No. 8,523,054.

(51) Int. Cl.
*G06Q 40/04* (2012.01)
*G06Q 20/28* (2012.01)

(56) References Cited

U.S. PATENT DOCUMENTS

| | | | |
|---|---|---|---|
| 2009/0094134 | A1 | 4/2009 | Toomer et al. |
| 2009/0182663 | A1 | 7/2009 | Hurst |
| 2009/0288012 | A1 | 11/2009 | Hertel et al. |
| 2010/0051689 | A1 | 3/2010 | Diamond |
| 2010/0076833 | A1 | 3/2010 | Nelsen |
| 2010/0100481 | A1 | 4/2010 | Doran et al. |
| 2010/0125510 | A1 | 5/2010 | Smith et al. |
| 2010/0205050 | A1 | 8/2010 | Wolfe et al. |
| 2010/0276484 | A1 | 11/2010 | Banerjee et al. |
| 2011/0057025 | A1* | 3/2011 | Denzer et al. ............ 235/375 |
| 2011/0079644 | A1 | 4/2011 | Wolfe et al. |
| 2011/0166992 | A1 | 7/2011 | Dessert et al. |
| 2011/0295744 | A1* | 12/2011 | Wisniewski ......... G06Q 20/105 705/41 |
| 2012/0099780 | A1 | 4/2012 | Smith et al. |
| 2012/0234911 | A1 | 9/2012 | Yankovich et al. |
| 2012/0234912 | A1 | 9/2012 | Yankovich et al. |
| 2013/0334304 | A1 | 12/2013 | Yankovich et al. |

FOREIGN PATENT DOCUMENTS

| | | |
|---|---|---|
| DE | 112012001269 T5 | 12/2013 |
| WO | WO-2012125910 A3 | 9/2012 |

OTHER PUBLICATIONS

"U.S. Appl. No. 13/050,699, Final Office Action mailed Aug. 6, 2012", 13 pgs.

"U.S. Appl. No. 13/050,699, Non-Final Office Action mailed Feb. 21, 2012", 12 pgs.

"U.S. Appl. No. 13/050,699, Notice of Allowance mailed Apr. 17, 2013", 13 pgs.

"U.S. Appl. No. 13/050,699, Response filed May 21, 2012 to Non Final Office Action mailed Feb. 21, 2012", 12 pgs.

"U.S. Appl. No. 13/050,699, Response filed Oct. 5, 2012 to Final Office Action mailed Aug. 6, 2012", 10 pgs.

"U.S. Appl. No. 13/341,142, Final Office Action mailed Aug. 3, 2012", 14 pgs.

"U.S. Appl. No. 13/341,142, Non Final Office Action mailed Feb. 21, 2012", 16 pgs.

"U.S. Appl. No. 13/341,142, Non Final Office Action mailed Apr. 16, 2013", 21 pgs.

"U.S. Appl. No. 13/341,142, Response filed Jan. 3, 2013 to Final Office Action mailed Aug. 3, 2012", 11 pgs.

"U.S. Appl. No. 13/341,142, Response filed May 21, 2012 to Non Final Office Action mailed Feb. 21, 2012", 10 pgs.

"U.S. Appl. No. 13/970,454, Notice of Allowance mailed Nov. 27, 2013", 13 pgs.

"U.S. Appl. No. 13/970,454, Preliminary Amendment filed Oct. 8, 2013", 9 pgs.

"International Application Serial No. PCT/US2012/029401, International Preliminary Report on Patentability mailed Sep. 26, 2013", 6 pgs.

"International Application Serial No. PCT/US2012/029401, Search Report mailed Oct. 23, 2012", 3 pgs.

"International Application Serial No. PCT/US2012/029401, Written Opinion mailed Oct. 23, 2012", 4 pgs.

Cannon, Ellen, "Gift card trading: The secondary market", [Online]. Retrieved from the Internet: <URL: http://web.archive.org/web/20101023133346/http://www.bankrate.com/finance/credit -cards/gift-card-trading-thesecondary-market-1.aspx>, (Oct. 23, 2010), 3 pgs.

"Australian Application Serial No. 2012229015, Amendments filed Aug. 24, 2015", 19 pgs.

"Australian Application Serial No. 2012229015, Notice of Acceptance mailed Aug. 28, 2015", 2 pgs.

"Canadian Application Serial No. 2,828,791, Office Action mailed Jan. 21, 2016", 3 pgs.

"Canadian Application Serial No. 2,828,791, Office Action mailed Jan. 23, 2015", 4 pgs.

"Canadian Application Serial No. 2,828,791, Response filed Jul. 23, 2015 to Office Action mailed Jan. 23, 2015", 11 pgs.

"German Application Serial No. 112012001269.0, Office Action mailed Apr. 7, 2016", with English translation of claims, 13 pgs.

"Australian Application Serial No. 2015268643, First Examiner Report dated Jul. 27, 2016", 2 pgs.

"Australian Application Serial No. 2015268643, Response filed Sep. 23, 2016 to First Examiner Report dated Jul. 27, 2016", 8 pgs.

"German Application Serial No. 112012001269.0, Office Action dated Mar. 7, 2017", w/ English Machine Translation, 26 pgs.

"German Application Serial No. 112012001269.0, Office Action dated Sep. 26, 2016", w/ English Machine Translation, 14 pgs.

"German Application Serial No. 112012001269.0, Response filed Sep. 20, 2016 to Office Action dated Apr. 7, 2016", w/ English Machine Translation, 42 pgs.

\* cited by examiner

| | |
|---|---|
| ISSUER NAME 602 | XYZ STORE |
| BALANCE 604 | $100 |
| TERMS 606 | EXPIRES 1/1/2011 |
| FINANCIAL ACCOUNT 608 | 123-456-7890 |
| DIGITAL PICTURE OF GIFT CARD 610 | XXXXX |
| DIGITAL PICTURE OF BAR CODE 612 | ///////|||\\\// |
| SERIAL NUMBER OF GIFT CARD 604 | 123A3NK4BDL3 |

GIFT CARD CONVERSION AND DIGITAL WALLET

RELATED APPLICATIONS

This application is a Continuation of U.S. application Ser. No. 13/970,454, filed on Aug. 19, 2013, which is a Continuation of U.S. application Ser. No. 13/341,142, filed on Dec. 30, 2011, which is a Continuation of U.S. application Ser. No. 13/050,699, filed on Mar. 17, 2011, all of which applications are incorporated herein by reference in their entirety.

TECHNICAL FIELD

Example embodiments of the present application generally relate to gift cards, and more specifically, to a method and system for scanning gift cards and transferring their values into digital cash for use or trade.

BACKGROUND

Gift cards and stored value cards have increased in popularity. A gift card or a pre-paid card may be a safe and convenient way to avoid carrying or handling cash and loose change. Stored value cards are frequently referred to as gift, pre-paid or cash cards, in that money is deposited or activated in the account associated with the card before use of the card is allowed. Also, it is often convenient to give pre-paid cards as gifts or to use pre-paid cards to pay for transactions while traveling.

While gift cards are desirable, it is often cumbersome to carry multiple gift cards redeemable only at merchants associated with the gift cards. Furthermore, the residual value or the remaining amount in a gift card can be forgotten.

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system convert the value of a gift card for use with a mobile device. Gift cards can be scanned and the value of the gift card can be transferred into digital cash for use or trade with mobile devices. A gift card converter module associates a value of the gift card with a digital wallet of the mobile device. A digital wallet module enables a financial transaction with the digital wallet of the mobile device. A storage device stores the value of the gift card associated with the digital wallet and the corresponding financial transaction.

Figure 1:
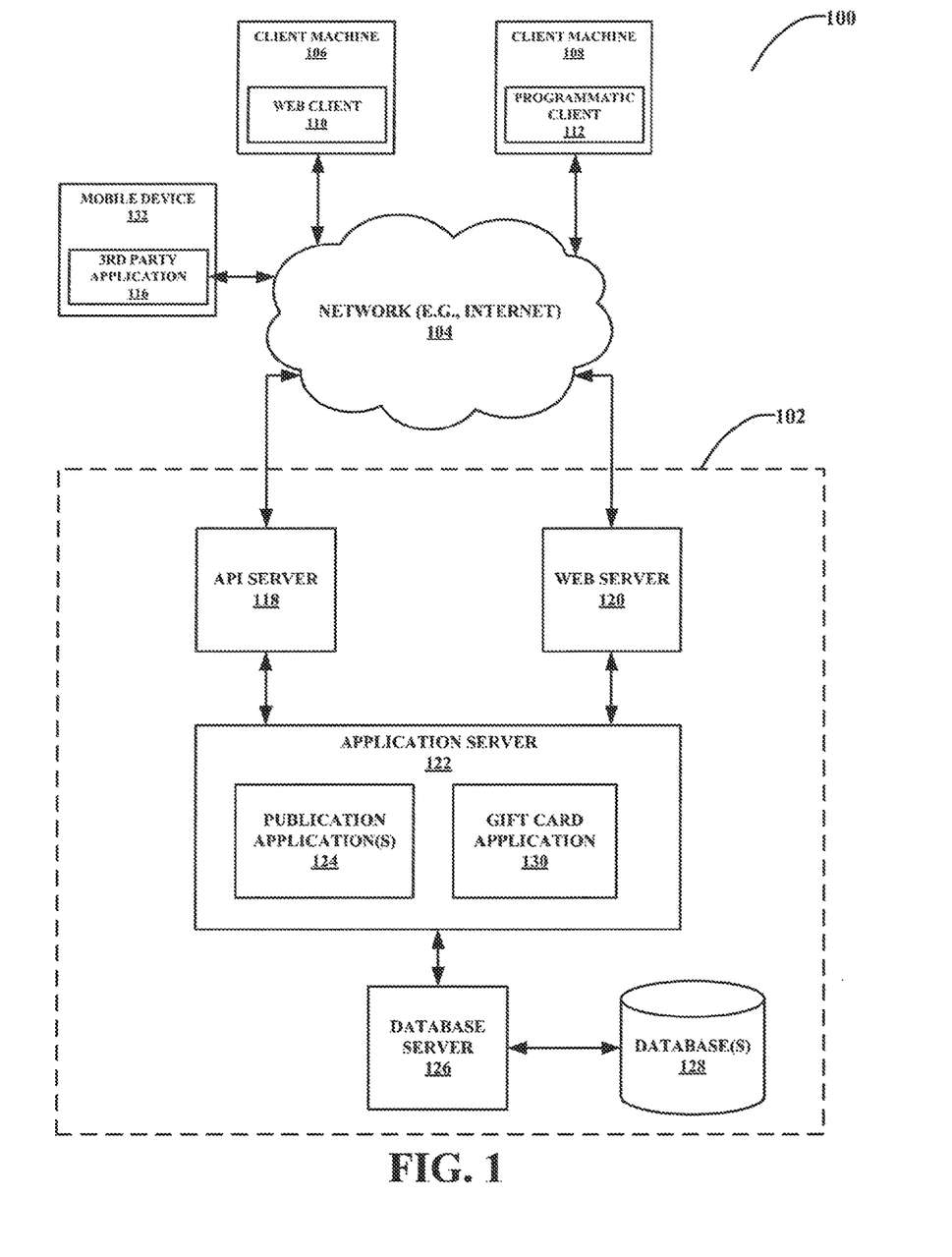
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include transmitting, receiving (communicating) and processing data to, from, and regarding content and users of the network system 100. The data may include, but are not limited to, content and user data such as feedback data; user reputation values; user profiles; user attributes; product and service reviews; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments the client machine 106, 108, or third party application 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 132 may also be in communication with the network-based publisher 102 via a web server 120. The mobile device 132 may include a portable electronic device providing at least some of the functionalities of the client machines 106 and 108. The mobile device 132 may include a third party application 116 (or a web client) configured communicate with application server 122.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

A publication application(s) 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users. Additionally, the publication application(s) 124 may track and store data and metadata relating to listings, transactions, and user interaction with the network-based publisher 102.

FIG. 1 also illustrates a third party application 116 that may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

A gift card application 130 creates a digital wallet for a user of the mobile device 132. The gift card application 130 associates a value of a gift card with the digital wallet of the user. The gift card application 130 also enables a financial transaction with the digital wallet of the mobile device 132. The value of the gift card associated with the digital wallet and the corresponding financial transaction are stored in a storage device such as database 128.

The gift card application 130 allows a user to scan a physical gift card with the mobile device 132. The monetary value associated with the scanned gift card is retrieved and stored in the digital wallet in database 128. In one embodiment, a user may scan the bar code on a gift card with his/her mobile device 132. The value of the scanned gift card is determined by communicating with an issuer of the gift card. The value on the scanned gift card is uploaded into the digital wallet of the user. The user can then use the gift card on their mobile device 132. Furthermore, the gift card application 130 can serve as a marketplace to pair buyers and sellers of scanned gift cards. The gift card application 130 may serve as a conduit for recognized scanned gift cards and enables the transfer of the value of the scanned gift card from a seller to a buyer.

Figure 2:
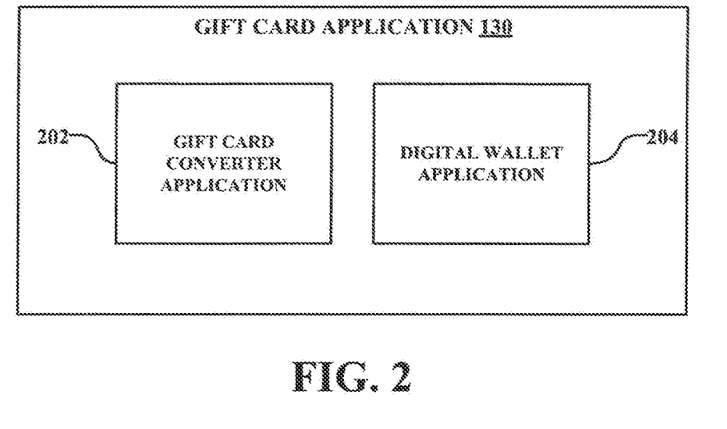
FIG. 2 is a block diagram illustrating an example embodiment of a gift card application.

FIG. 2 is a block diagram illustrating an example embodiment of a gift card application 130, which may be provided as part of the network-based publisher 102 or may be a standalone application within application server 122. The gift card application 130 has a gift card converter application 202 and a digital wallet application 204. The gift card converter application 202 associates a value of a gift card with a digital wallet of a mobile device. The digital wallet application 204 enables a financial transaction with the digital wallet of the mobile device. The value of the gift card associated with the digital wallet and the corresponding financial transaction is stored in a storage device such as database 130.

Figure 3:
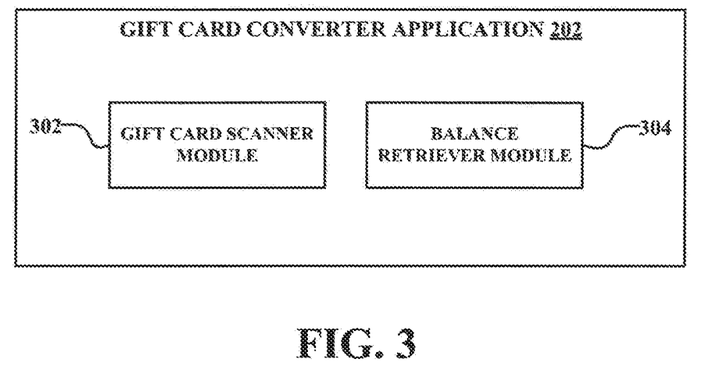
FIG. 3 is a block diagram illustrating an example embodiment of a gift card converter application.

FIG. 3 is a block diagram illustrating an example embodiment of a gift card converter module 202. The gift card converter module 202 has a gift card scanner module 302 and a balance retriever module 304.

The gift card scanner module 302 receives a digital image of the gift card from the mobile device. For example, the digital image of the gift card includes a machine-readable symbol such as a bar code. The user may take a picture or a video of the bar code of the gift card with his/her mobile device 132.

The gift card scanner module 302 receives a picture or video of the gift card from the mobile device 132. For example, the mobile device 132 may include an optical device (e.g. a lens) configured to capture an image or video frames of the gift card (front and/or back). The mobile device 132 may then upload the captured image to the gift card scanner module 302. The gift card scanner module 302 processes the captured image of the gift card to extract the issuer name (e.g. bank name), unique account number, serial number, expiration date, and so forth using, for example, an optical character recognition (OCR) algorithm.

In another embodiment, the user of the mobile device scans a unique Radio Frequency Identification (RFID) tag associated with the gift card. The gift card scanner module 302 receives the RFID tag associated with the gift card. In yet another embodiment, the user of the mobile device scans a unique magnetic stripe from the gift card. The gift card scanner 302 receives the code from the magnetic stripe associated with the gift card.

In another embodiment, the gift card scanner module 302 may be configured to receive an email from the issuer of the gift card for the user of the mobile device 132. For example, the user purchases a gift card online and receives via email an electronic copy of an invoice for the gift card and the serial number, bar code, code for the gift card, value, expiration date, and so forth. The user may then forward the email to the gift card scanner module 302. Thus, the gift card scanner module 302 receives the gift card in electronic form via email.

In another embodiment, the gift card scanner module 302 is configured to receive a manual entry from the user about a gift card. The gift card scanner module 302 receives data from the gift card from the user of the mobile device 132. The user enters the data manually (e.g., text input) at the mobile device 132. For example, the user may enter the serial number, bar code, expiration date, issuer, and so forth of a gift card.

The balance retriever module 304 retrieves the value of the gift card from an issuer of the gift card based on the received data (e.g., digital picture, bar code, RFID tag, magnetic strip) from the gift card transmitted by the mobile device 132. In one embodiment, the balance retriever module 304 communicates with the issuer of the gift card via a network to obtain the current or latest balance or value of the gift card. In another embodiment, the balance retriever module 304 communicates with a third party to determine the latest balance or value of the gift card.

The balance retriever module 304 then associates the retrieved value of the gift card with a gift card balance in the digital wallet of the user. In one embodiment, the digital wallet of the user comprises a financial account of the user. As such, if the balance of the scanned gift card is ten dollars, the balance of the financial account of the user will reflect a ten dollar credit from the scanned gift card. It should be noted that gift cards carry only a positive value and cannot be less than zero dollars. As such, scanned gift cards produce only credits to the financial account of the user. The financial account of the user and the corresponding gift card are debited when the user performs a financial transaction (e.g. purchase an item with the gift card).

In another embodiment, the gift card can be replenished by transferring money to the issuer (or a third party) of the gift card. For example, the user may transfer money from his personal checking account to the financial account associated with the issuer of the gift card.

In yet another embodiment, several gift cards from the same issuer can be combined into a single gift card. Also, several scanned gift cards can be combined into a single account in the digital wallet of the user. For example, the user may have several gift cards with the same or different amounts from The XYZ store. The gift card scanner module 202 may receive a digital picture for each gift card from the same issuer. The balance retriever module 304 combines the total value from all the gift cards and stores them in a single financial account associated with the issuer in the digital wallet for the user. As such, the user does not have to keep track of the individual value of each gift card from the same issuer. The balance retriever module 304 enables the user to transparently perform a financial transaction with the single account of the user without having to keep track of the multiple gift cards from the same issuer.

Figure 4:
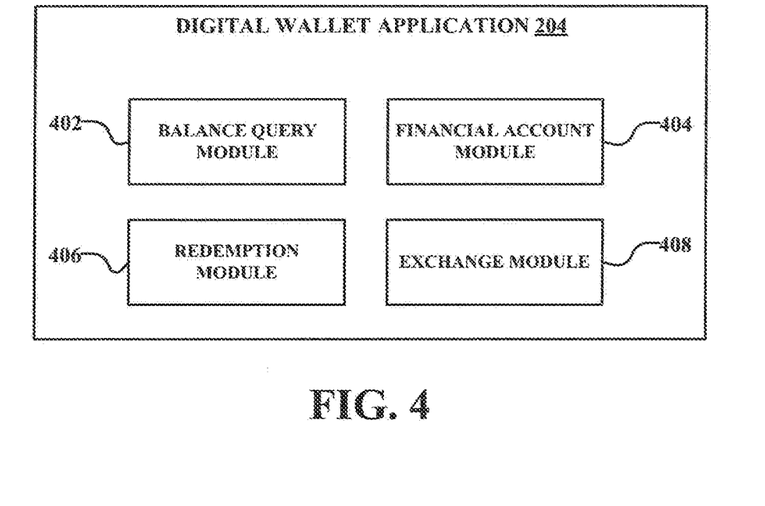
FIG. 4 is a block diagram illustrating an example embodiment of a digital wallet application.

FIG. 4 is a block diagram illustrating an example embodiment of the digital wallet application 204. The digital wallet application 204 has a balance query module 402, a financial account module 404, a redemption module 406, and an exchange module 408.

The balance query module 402 retrieves an updated value of the gift card from the issuer of the gift card. The balance query module 402 queries the balance of the gift card from an issuer of the gift card based on the previously received data from the gift card with the mobile device 132. In one embodiment, the balance query module 402 communicates with the issuer of the gift card via a network to obtain the latest balance of the gift card. In another embodiment, the balance query module 402 communicates with a third party to determine the latest balance of the gift card.

The financial account module 404 links the latest gift card balance in the digital wallet with a financial account of a user of the mobile device. For example, the user receives a ten dollar gift card for XYZ store. The financial account module 404 now links a checking account of the user with the gift card from XYZ store. As such, now the checking account reflects a ten dollar credit.

In another embodiment, the financial account module 404 links the gift card balance in the digital wallet with a disposable gift card financial account of the user of the mobile device. For example, the user receives a ten dollar gift card for XYZ store. A new unique financial account is created for the user based on the ten dollar gift card for XYZ. As such, the unique financial account is debited when the user uses the gift card for XYZ merchandise. Furthermore, the unique financial account includes a disposable account number. Thus, when the gift card balance becomes zero, the financial account link module 404 deletes the disposable account number (e.g., unique financial account).

The redemption module 406 displays a digital image of the gift card for the financial transaction. For example, when the user is ready to redeem his/her gift card, the user can display an image of the gift card on his/her mobile device 132 to perform a financial transaction. A cashier at a store of the issuer would then scan the mobile device 132 to redeem the gift card. For example, the cashier at the XYZ store would scan a bar code displayed on the mobile device 132 of the user to access the balance of the corresponding gift card. If there is enough money in the gift card, the financial transaction proceeds. If there is not enough money in the gift card, the user of the mobile device 132 is then notified and asked to pay using an alternative method.

After the financial transaction is completed, the redemption module 406 retrieves an updated value of the gift card and updates the gift card balance in the digital wallet and the linked financial account of the user of the mobile device.

The exchange module 408 creates a marketplace where gift cards can be bought, sold, or exchanged. For example, a user may wish to trade his/her gift card for XYZ store/issuer for a gift card associated with another store/issuer. Alternatively, the user may wish to sell his/her gift card for XYZ store/issuer for cash. As such, the exchange module 408 transfer the value of a first gift card from a first issuer for the value of a second gift card from a second issuer. In another embodiment, the exchange module 408 transfers the value of a first gift card from a first issuer for a cash value.

Figure 5:
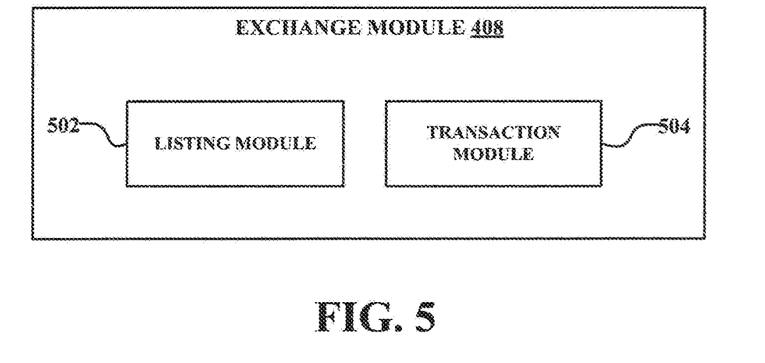
FIG. 5 is a block diagram illustrating an example embodiment of an exchange module.

FIG. 5 is a block diagram illustrating an example embodiment of the exchange module 408. The exchange module 408 has a listing module 502 and a transaction module 504.

The listing module 502 generates a gift card listing for a gift card exchange market. A user may wish to list his gift card in his digital wallet for sale or to exchange with another gift card. An example of a gift card listing includes but is not limited to a name of an issuer of a gift card, a value of the gift card, and the terms of the gift card (e.g., expires in six months). In an example embodiment, the serial number or code for the gift card may not be listed so as to prevent fraud.

When a user decides to swap his/her gift card with another user, the transaction module 504 transfers a digital image of the first gift card from the first issuer from a first user to the digital wallet of a second user. Similarly, the transaction module 504 transfers a digital image of the second gift card from the second issuer from a second user to the digital wallet of the first user. The transferred information contains all the information pertinent to enabling a financial transaction with the corresponding gift card.

Furthermore, the transaction module 504 updates a financial account of the first user with the value of the second gift card and a financial account of the second user with the value of the first gift card.

Upon completion of the exchange, the transaction module 504 removes the listing from the gift card marketplace.

Figure 6:
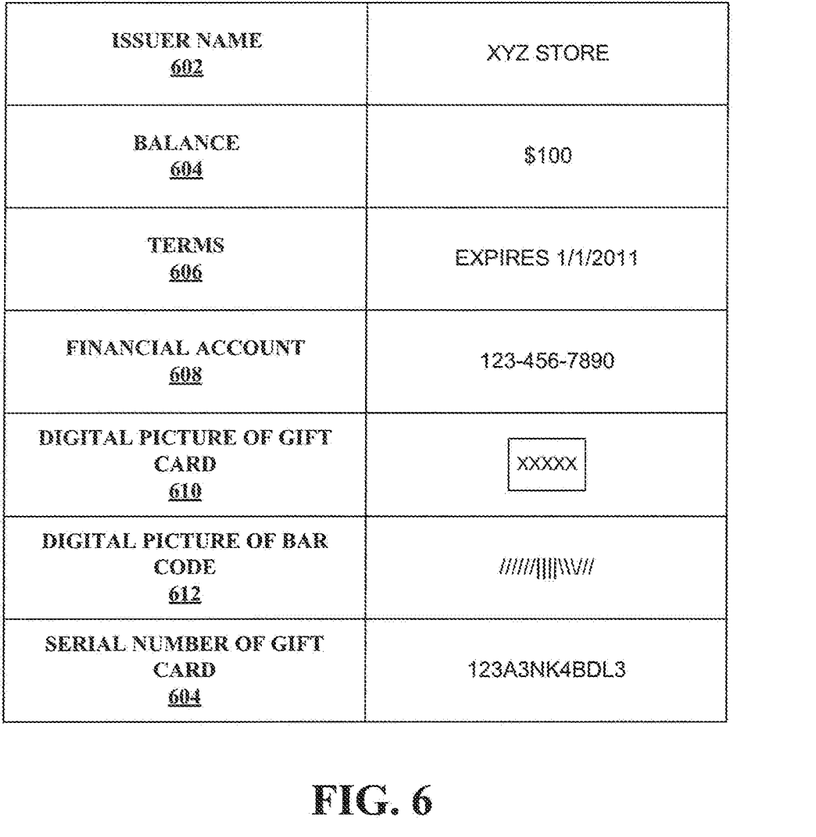
FIG. 6 is a block diagram of an example of a data structure for storing a gift card in a digital wallet.

FIG. 6 is a block diagram of an example of a data structure 600 for storing a gift card in the digital wallet. The data structure 600 includes but is not limited to the name of the issuer 602, the latest balance of the gift card 604, the terms of the gift card 606, a linked financial account of a user 608, a digital picture of the gift card 610, a digital picture of the bar code 612, and a serial number of the gift card 614.

Figure 7:
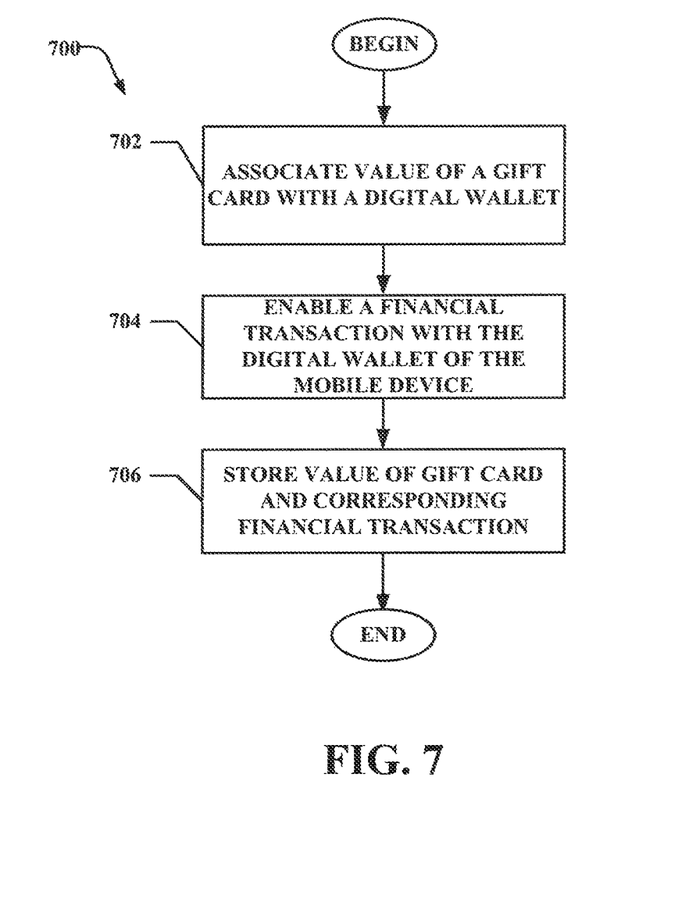
FIG. 7 is a flow chart of an example method for enabling a financial transaction with a virtual gift card.

FIG. 7 is a flow chart of an example method for enabling a financial transaction with a virtual gift card. At 702, the gift card application 130 associates a value of a gift card with a digital wallet of a mobile device. At 704, the gift card application 130 enables a financial transaction with the digital wallet of the mobile device. At 706, the gift card application 130 stores the value of the gift card associated with the digital wallet and the corresponding financial transaction.

Figure 8:
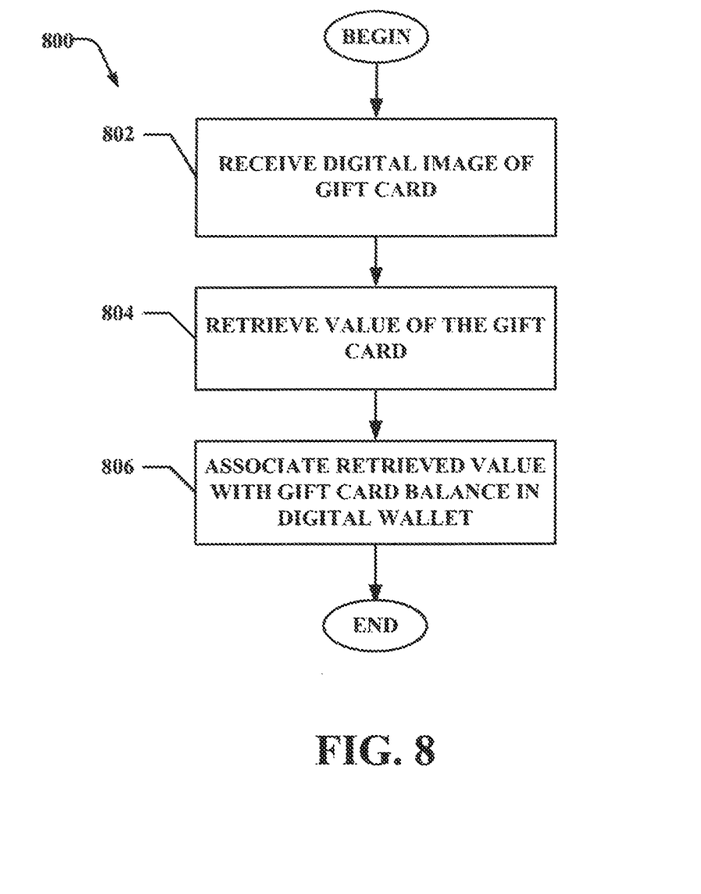
FIG. 8 is a flow chart of an example method for converting gift cards.

FIG. 8 is a flow chart of an example method for converting gift cards. At 802, the gift card scanner module 302 receives a digital image of the gift card. In one embodiment, the digital image of the gift card comprises a machine-readable symbol. At 804, the balance retriever module 304 retrieves the value of the gift card from an issuer of the gift card. At 806, the balance retriever module 304 associates the retrieved value of the gift card with a gift card balance in the digital wallet.

Figure 9:
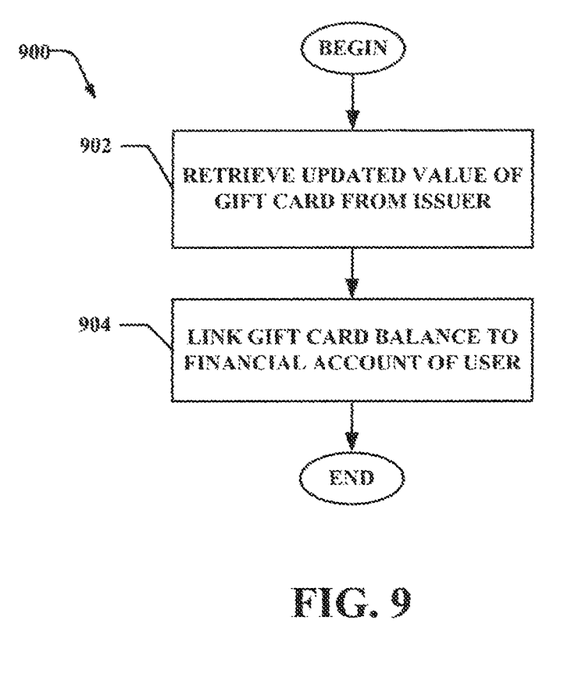
FIG. 9 is a flow chart of an example method for querying a balance of a gift card.

FIG. 9 is a flow chart of an example method for linking a gift card to a financial account of a user. At 902, the balance query module 402 retrieves an updated value of the gift card from the issuer of the gift card. At 904, the financial account module 404 links the gift card balance in the digital wallet with a financial account of a user of the mobile device. In another embodiment, the financial account module 404 links the gift card balance in the digital wallet with a disposable gift card financial account of the user of the mobile device. The disposable gift card financial account is deleted when the gift card balance is zero.

Figure 10:
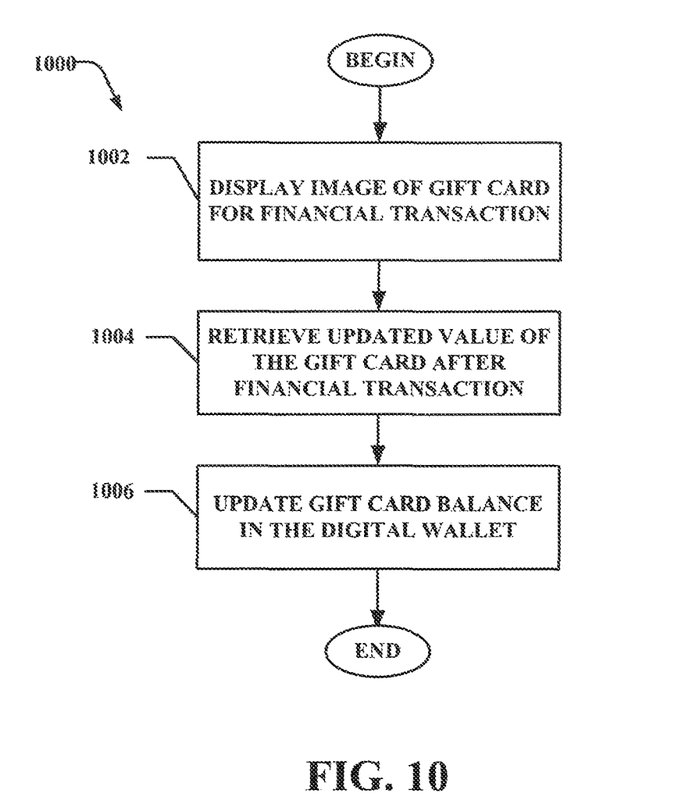
FIG. 10 is a flow chart of an example method for linking a gift card to a financial account of a user.

FIG. 10 is a flow chart of an example method for redeeming a gift card in a virtual wallet. At 1002, the redemption module 406 displays a digital image of the gift card for a financial transaction on the mobile device of the user. The digital image of the gift card is then scanned at the cashier. At 1004, the balance query module 402 retrieves an updated value of the gift card after the financial transaction. At 1006, the balance query module 402 updates the gift card balance in the digital wallet and the linked financial account of the user of the mobile device.

Figure 11:
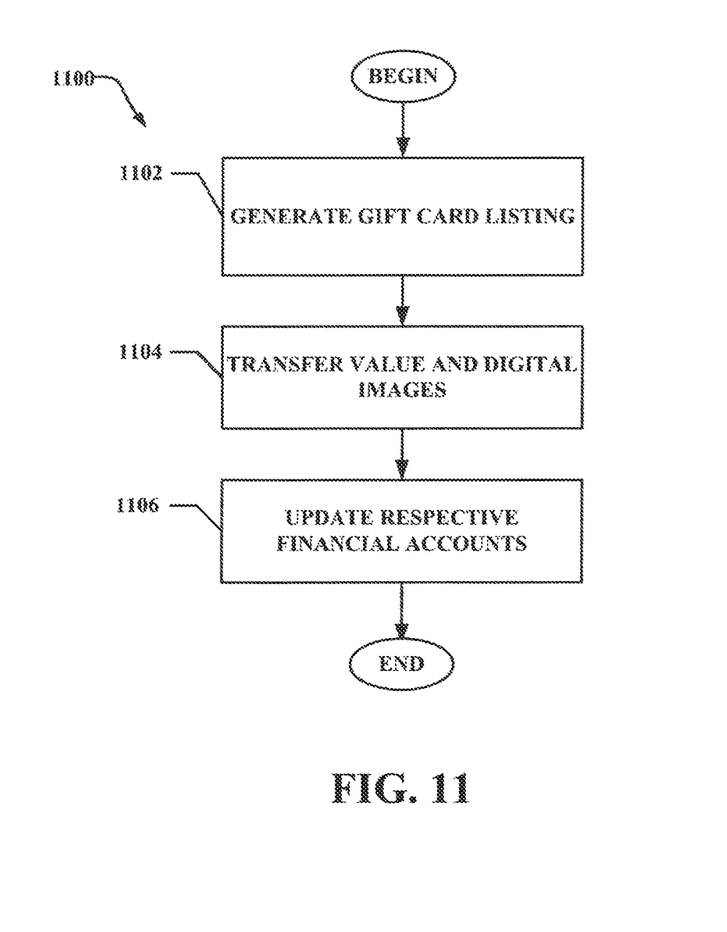
FIG. 11 is a flow chart of an example method for exchanging gift cards.

FIG. 11 is a flow chart of an example method for exchanging gift cards. At 1102, exchange module 408 generates a gift card listing for a gift card exchange market. In one embodiment, the gift card listing comprises, but is not limited to, a name of an issuer of a gift card, a value of the corresponding gift card, and the terms of the corresponding gift card.

At 1104, exchange module 408 transfers a digital image of the first gift card from the first issuer from a first user to the digital wallet of a second user, and a digital image of the second gift card from the second issuer from a second user to the digital wallet of the first user. In another embodiment, exchange module 408 transfers the value of a first gift card from a first issuer with the value of a second gift card from a second issuer. At 1106, exchange module 408 updates a financial account of the first user with the value of the second gift card, and a financial account of the second user with the value of the first gift card.

Figure 12:
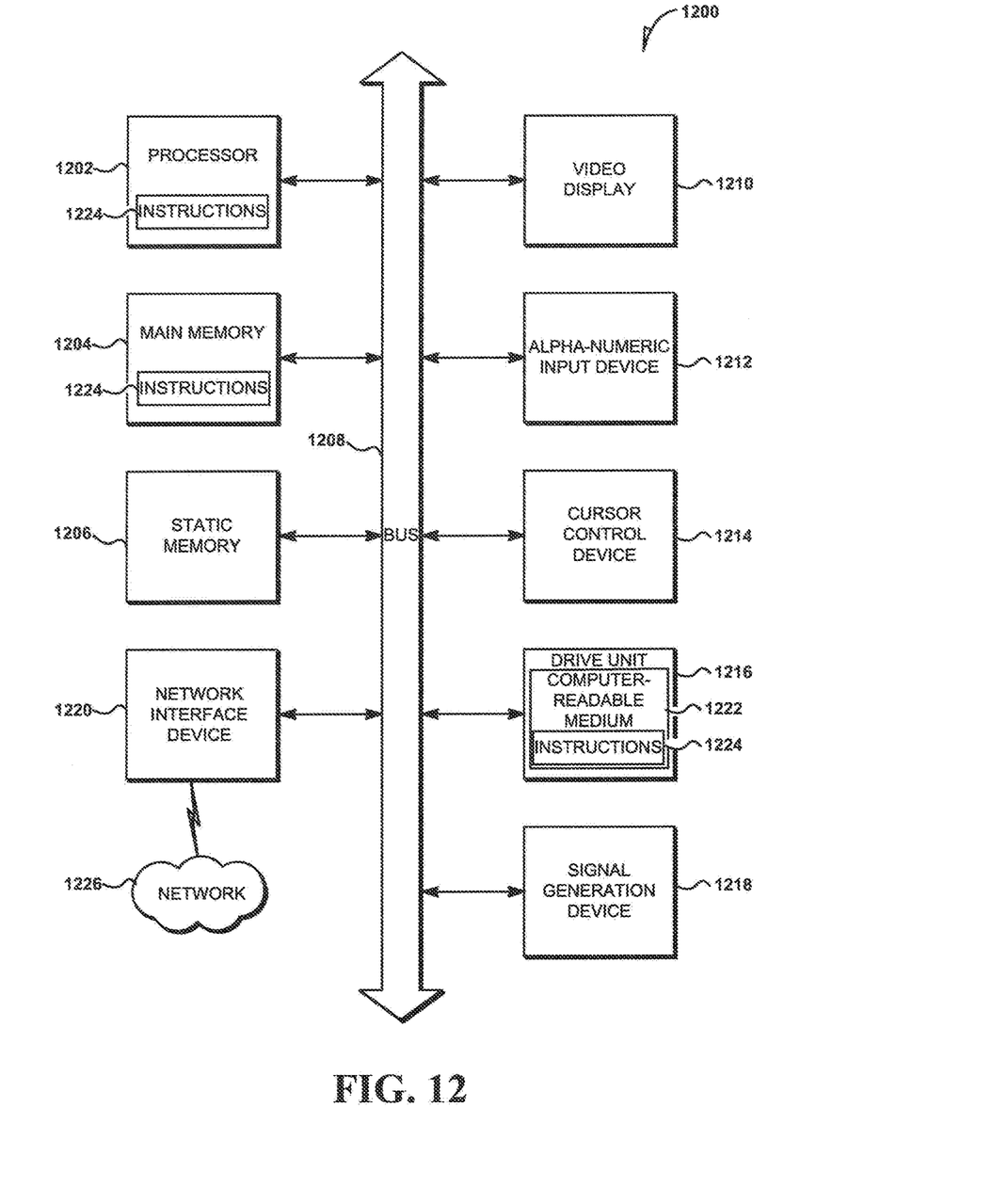
FIG. 12 shows a diagrammatic representation of machine in the example form of a computer system within which a set of instructions may be executed to cause the machine to perform any one or more of the methodologies discussed herein.

FIG. 12 shows a diagrammatic representation of machine in the example form of a computer system 1200 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation device 1214 (e.g., a mouse), a disk drive unit 1216, a signal generation device 1218 (e.g., a speaker) and a network interface device 1220.

The disk drive unit 1216 includes a machine-readable medium 1222 on which is stored one or more sets of instructions and data structures (e.g., software 1224) embodying or utilized by any one or more of the methodologies or functions described herein. The software 1224 may also reside, completely or at least partially, within the main memory 1204 and/or within the processor 1202 during execution thereof by the computer system 1200, the main memory 1204 and the processor 1202 also constituting machine-readable media.

The software 1224 may further be transmitted or received over a network 1226 via the network interface device 1220 utilizing any one of a number of well-known transfer protocols (e.g., HTTP).

While the machine-readable medium 1222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
one or more hardware processors configured to include:
a gift card module to:
query a first server, associated with an issuer of a first gift card and a second gift card, for a balance of the first gift card;
query the first server for the balance of the second gift card, the balance of the first gift card different than the balance of the second gift card; and
a financial account module to:
query a second server, associated with a pre-established banking account of a user, for a balance of the pre-established banking account accessible via a mobile computing device associated with a first user, a source of the pre-established banking account being different than the issuer of the first and second gift cards:
generate a link, in the mobile computing device, between the pre-established banking account and the first and second gift cards by computing a new balance of the pre-established banking account based on a sum of respective balances of the first and second gift cards and a current balance of the pre-established banking account;
cause display, on the mobile computing device, of the new balance of the pre-established banking account without a respective identification of the first and second gift cards; and
operate a financial transaction, between the mobile computing device and the first server, on the respective balance of the first gift card via the pre-established banking account on the mobile computing device, the financial transaction occurring in response to a presentation of a representation of the first gift card on the mobile computing device.

2. The system of claim 1, wherein the financial account module is to:
determine that a second user does not have a checking account;
generate a disposable account number for a new bank account for the second user;
include the at least one of the respective balances of the first and second gift cards in the balance of the new bank account of the second user; and
delete the new bank account of the second user in response to a zero balance in both respective balances of the first and second gift cards.

3. The system of claim 1, wherein the one or more hardware processors are further configured to include:
a listing module to generate a gift card listing of gift cards available exchange offers in a gift card exchange market; and
a transaction module to transfer a captured digital image of the first gift card from a first digital payment account to a second digital payment account, the captured digital image of the first gift card for use by a second user, and to transfer a captured digital image of a third gift card from a second issuer from a second digital payment account to the first digital payment account, the captured digital image of the third gift card for use by the first user, the first gift card and the third gift card listed for exchange in the gift card exchange market, the first issuer different than the second issuer, the pre-established banking account comprising first digital payment account.

4. The system of claim 3, wherein the one or more hardware processors are further configured to include:
a gift card converter module to determine a value of the first gift card and a value of the third gift card;
a storage device to store the value of the first gift card in the first digital payment account, and to store the value of the third gift card in the second digital payment account;
a digital wallet module to perform a first financial transaction corresponding to the first issuer of the first gift card on the first digital payment account, and to perform a second financial transaction corresponding to the second issuer of the third gift card on the second digital payment account; and
an exchange module to receive a request to trade the first gift card with the third gift card, and in response to the request, exchange the value of the first gift card in the first digital payment account with the value of the third gift card in the second digital payment account.

5. The system claim 4, wherein the gift card converter module comprises:
a gift card scanner module configured to receive an image of the first gift card via an optical input of the mobile computing device, the mobile computing device associated with the first digital payment account, the image of the first gift card comprising a machine-readable symbol;
a balance query module configured to query the value of the first gift card from the first service of the first issuer of the gift card based on the image of the first gift card.

6. The system of claim 5, wherein the digital wallet module comprises:
a redemption module configured to:
display the image of the first gift card on the mobile computing device for the first financial transaction;
retrieve an updated value of the first gift card after the first financial transaction; and
update the first gift card balance in the first digital payment account and the financial account of the first user.

7. The system of claim 3, wherein the transaction module is further configured to:
update the first digital payment account with the value of the third gift card; and
update the second digital payment account with the value of the first gift card.

8. The system of claim 3, wherein the gift card listing comprises a name of a respective issuer of a respective gift card, a corresponding value of the respective gift card, and corresponding terms of the respective gift card.

9. A computer-implemented method, comprising:
querying a first server, associated with an issuer of a first gift card and a second gift card, for a balance of the first gift card;
querying the first server for the balance of the second gift card, the balance of the first gift card different than the balance of the second gift card; and querying a second server, associated with a pre-established banking account of a user, for a balance of the pre-established banking account accessible via a mobile computing device associated with a first user, a source of the pre-established banking account being different than the issuer of the first and second gift cards;

generating a link, in the mobile computing device, between the pre-established banking account and the first and second gift cards by computing a new balance of the pre-established banking account based on a sum of respective balances of the first and second gift cards and a current balance of the pre-established banking account;

cause display, on the mobile computing device, of the new balance of the pre-established banking account without a respective identification of the first and second gift cards; and operating a financial transaction, between the mobile computing device and the first server, on the respective balance of the first gift card via the pre-established banking account on the mobile computing device, the financial transaction occurring in response to a presentation of a representation of the first gift card on the mobile computing device.

10. The computer-implemented method of claim 9, further comprises:

determining that a second user does not have a pre-established banking account;

generating a disposable account number for a new bank account for the second user;

including the at least one of the respective balances of the first and second gift cards in the balance of the new bank account of the second user; and deleting the new bank account of the second user in response to a zero balance in both respective balances of the first and second gift cards.

11. The computer-implemented method of claim 9, further comprising:

generating a gift card listing of gift cards available for exchange offers in a gift card exchange market; and transferring a captured digital image of the first gift card from a first digital payment account to a second digital payment account, the captured digital image of the first gift card for use by a second user;

transferring a captured digital image of a third gift card from a second issuer from a second digital payment account to the first digital payment account, the captured digital image of the third gift card for use by the first user, the first gift card and the third gift card listed for exchange in the gift card exchange market, the first issuer different than the second issuer, the pre-established banking account comprising first digital payment account.

12. The computer-implemented method of claim 11, further comprising determining a value of the first gift card and a value of the third gift card;

storing the value of the first gift card in the first digital payment account, and to store the value of the third gift card in the second digital payment account;

performing a first financial transaction corresponding to the first issuer of the first gift card on the first digital payment account;

performing a second financial transaction corresponding to the second issuer of the third gift card on the second digital payment account; and receiving a request to trade the first gift card with the third gift card; and in response to the request, exchanging the value of the first gift card in the first digital payment account with the value of the third gift card in the second digital payment account.

13. The computer-implemented method of claim 12, further comprising:

receiving an image of the first gift card via an optical input of the mobile computing device, the mobile computing device associated with the first digital payment account, the image of the first gift card comprising a machine-readable symbol; and querying the value of the first gift card from the first service of the first issuer of the gift card based on the image of the first gift card.

14. The computer-implemented method of claim 13, further comprising:

displaying the image of the first gift card on the mobile computing device for the first financial transaction;

retrieving an updated value of the first gift card after the first financial transaction; and updating the first gift card balance in the first digital payment account and the financial account of the first user.

15. The computer-implemented method of claim 11, further comprising:

updating the first digital payment account with the value of the third gift card; and updating the second digital payment account with the value of the first gift card.

16. The computer-implemented method of claim 11, wherein the gift card listing comprises a name of a respective issuer of a respective gift card, a corresponding value of the respective gift card, and corresponding terms of the respective gift card.

17. A non-transitory computer-readable storage medium storing a set of instructions that, when executed by one or more processors of a machine, causes the machine to perform operations, comprising:

querying a first server, associated with an issuer of a first gift card and a second gift card, for a balance of the first gift card;

querying the first server for the balance of the second gift card, the balance of the first gift card different than the balance of the second gift card; and querying a second server, associated with a pre-established banking account of a user, for a balance of the pre-established banking account accessible via a mobile computing device associated with a first user, a source of the pre-established banking account being different than the issuer of the first and second gift cards;

generating a link, in the mobile computing device, between the pre-established banking account and the first and second gift cards by computing a new balance of the pre-established banking account based on a sum of respective balances of the first and second gift cards and a current balance of the pre-established banking account;

cause display, on the mobile computing device, of the new balance of the pre-established banking account without a respective identification of the first and second gift cards; and operating a financial transaction, between the mobile computing device and the first server, on the respective balance of the first gift card via the pre-established banking account on the mobile computing device, the financial transaction occurring in response to a presentation of a representation of the first gift card on the mobile computing device.

18. The non-transitory computer-readable storage medium of claim 17, the operations further comprises:
   determining that a second user does not have a pre-established banking account;
   generating a disposable account number for a new bank account for the second user;
   including the at least one of the respective balances of the first and second gift cards in the balance of the new bank account of the second user and
   deleting the new bank account of the second user in response to a zero balance in both respective balances of the first arid second gift cards.

19. The non-transitory computer-readable storage medium of claim 17, the operations further comprising:
   generating a gift card listing of gift cards available for exchange offers in a gift card exchange market; and
   transferring a captured digital image of the first gift card from a first digital payment account to a second digital payment account, the captured digital image of the first gift card for use by a second user;
   transferring a captured digital image of a third gift card from a second issuer from a second digital payment account to the first digital payment account, the captured digital image of the third gift card for use by the first user, the first gift card and the third gift card listed for exchange in the gift card exchange market, the first issuer different than the second issuer, the pre-established banking account comprising first digital payment account.

20. The non-transitory computer-readable storage medium of claim 19, the operations further comprising
   determining a value of the first gift card and a value of the third gift card;
   storing the value of the first gift card in the first digital payment account, arid to store the value of the third gift card in the second digital payment account;
   performing a first financial transaction corresponding to the first issuer of the first gift card on the first digital payment account;
   performing a second financial transaction corresponding to the second issuer of the third gift card on the second digital payment account; and
   receiving a request to trade the first gift card with the third gift card; and
   in response to the request, exchanging the value of the first gift card in the first digital payment account with the value of the third gift card in the second digital payment account.

21. The non-transitory computer-readable storage medium of claim 20, the operations further comprising:
   receiving an image of the first gift card via an optical input of the mobile computing device, the mobile computing device associated with the first digital payment account, the image of the first gift card comprising a machine-readable symbol; and
   querying the value of the first gift card from the first service of the first issuer of the gift card based on the image of the first gift card.

22. The non-transitory computer-readable storage medium of claim 21, the operations further comprising:
   displaying the image of the first gift card on the mobile computing device for the first financial transaction;
   retrieving an updated value of the first gift card after the first financial transaction; and
   updating the first gift card balance in the first digital payment account and the financial account of the first user.

23. The non-transitory computer-readable storage medium of claim 19, the operations further comprising:
   updating the first digital payment account with the value of the third gift card; and
   updating the second digital payment account with the value of the first gift card.

24. The non-transitory computer-readable storage medium of claim 19, wherein the gift card listing comprises a name of a respective issuer of a respective gift card, a corresponding value of the respective gift card, and corresponding terms of the respective gift card.

* * * * *

UNITED STATES PATENT AND TRADEMARK OFFICE
CERTIFICATE OF CORRECTION

PATENT NO. : 9,727,856 B2
APPLICATION NO. : 14/230626
DATED : August 8, 2017
INVENTOR(S) : Steve Yankovich et al.

Page 1 of 1

It is certified that error appears in the above-identified patent and that said Letters Patent is hereby corrected as shown below:

In the Claims

In Column 9, Line 29, in Claim 1, delete "cards:" and insert -- cards; --, therefor.

In Column 9, Line 63, in Claim 3, after "available" insert -- for --.

In Column 10, Line 30, in Claim 5, after "system" insert -- of --.

In Column 13, Line 13, in Claim 18, delete "user" and insert -- user; --, therefor.

In Column 13, Line 16, in Claim 18, delete "arid" and insert -- and --, therefor.

In Column 13, Line 39, in Claim 20, delete "arid" and insert -- and --, therefor.

Signed and Sealed this
Twenty-sixth Day of June, 2018

Andrei Iancu
*Director of the United States Patent and Trademark Office*